April 29, 1958 J. T. DAVIDSON ET AL 2,832,455

STRIP FEEDING MECHANISM

Filed March 18, 1955 5 Sheets-Sheet 1

INVENTOR.
JOHN T. DAVIDSON
PERCY G. STIMSON
THOMAS E. LANDGREN

BY Tom Walker

STRIP FEEDING MECHANISM

Filed March 18, 1955 5 Sheets-Sheet 2

INVENTOR.
JOHN T. DAVIDSON
PERCY G. STIMSON
THOMAS E. LANDGREN

BY Tom Walker

April 29, 1958 J. T. DAVIDSON ET AL 2,832,455

STRIP FEEDING MECHANISM

Filed March 18, 1955

5 Sheets-Sheet 3

INVENTOR.
JOHN T. DAVIDSON
PERCY G. STIMSON
THOMAS E. LANDGREN

BY Tom Walker

INVENTOR.
JOHN T. DAVIDSON
PERCY G. STIMSON
THOMAS E. LANDGREN
BY
Tom Walker

STRIP FEEDING MECHANISM

Filed March 18, 1955 5 Sheets-Sheet 5

INVENTOR.
JOHN T. DAVIDSON
PERCY G. STIMSON
THOMAS E. LANDGREN
BY
Tom Walker

United States Patent Office 2,832,455

Patented Apr. 29, 1958

2,832,455

STRIP FEEDING MECHANISM

John T. Davidson, Percy G. Stimson, and Thomas E. Landgren, Dayton, Ohio, assignors to The Standard Register Company, Dayton, Ohio, a corporation of Ohio Application March 18, 1955, Serial No. 495,092

20 Claims. (Cl. 197—133)

This invention relates to strip feeding mechanism, and more particularly to a line finding mechanism in a writing machine.

The purpose of the invention is to adapt a line finder mechanism in an electrically powered typewriting or like machine, to create a signal for any remotely located business machine, causing it to be automatically operated for such functions as punching tape, carriage return, or tabulator spacing. A further purpose is to create a signal which will operate a slave mechanism substantially in synchronism with the line finder mechanism. Thus, in operating on series connected preprinted record forms, the successive forms are filled in to individually varying extent, and from the last entry of one form to the first writing line of the next succeeding form the record strip is skip fed. Remotely controlled apparatus operating through the same line spacing steps must thus be sensitive to the line finder mechanism.

As a further example of the use of the present invention, a writing machine known as a Flexowriter, automatically operates from a coded tape previously prepared, to type a form letter over and over. The line finder always starts the letter at the same place on each successive form. Such continuous form or strip could be guided to a second Flexowriter having a prepared tape of names and addresses. The different names and addresses would be typed in their proper place, again employing the automatic line finder. Starting and stopping of the second Flexowriter after each name and address may be automatically controlled from the line finding mechanism in accordance with the instant invention.

The object of the invention is to simplify the construction as well as the means and mode of operation of strip feeding mechanism, whereby such mechanism may not only be economically manufactured, but will be more efficient and satisfactory in use, adaptable to a wide variety of applications, have relatively few parts and be unlikely to get out of repair.

Another object of the invention is to utilize in connection with the automatic line finder mechanism a rotary stepping switch optionally located for direct physical actuation by the line finder mechanism or placed in relatively remote position and operating independently thereof but under common control for substantially synchronized results.

A further object of the invention is to provide a generally new coupling mechanism in the drive between the strip feeding mechanism and the writing platen whereby the platen may readily be placed under control of power operating means or released therefrom for hand actuation.

Still another object of the invention is to obviate binding in the motion transmission mechanism whereby to insure a free rotary movement of the platen at the same time that the platen is shifted laterally as a part of the writing machine carriage.

A still further object of the invention is to provide for alternative actuation of the strip feeding devices by a stall type motor whereby to simplify the driving mechanism and to avoid the need for certain clutch and switch controls.

A further object of the invention is to provide a strip feeding mechanism possessing the advantageous structural features, the inherent meritorious characteristics and the mode of operation herein described.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

Referring to the accompanying drawings, wherein is shown one but obviously not necessarily the only form of embodiment of the invention, Fig. 1 is a view in perspective of a Flexowriter equipped typewriting machine having strip feeding apparatus in accordance with the instant illustrated form of the invention;

Like parts are indicated by similar characters of reference throughout the several views.

Figure 1:
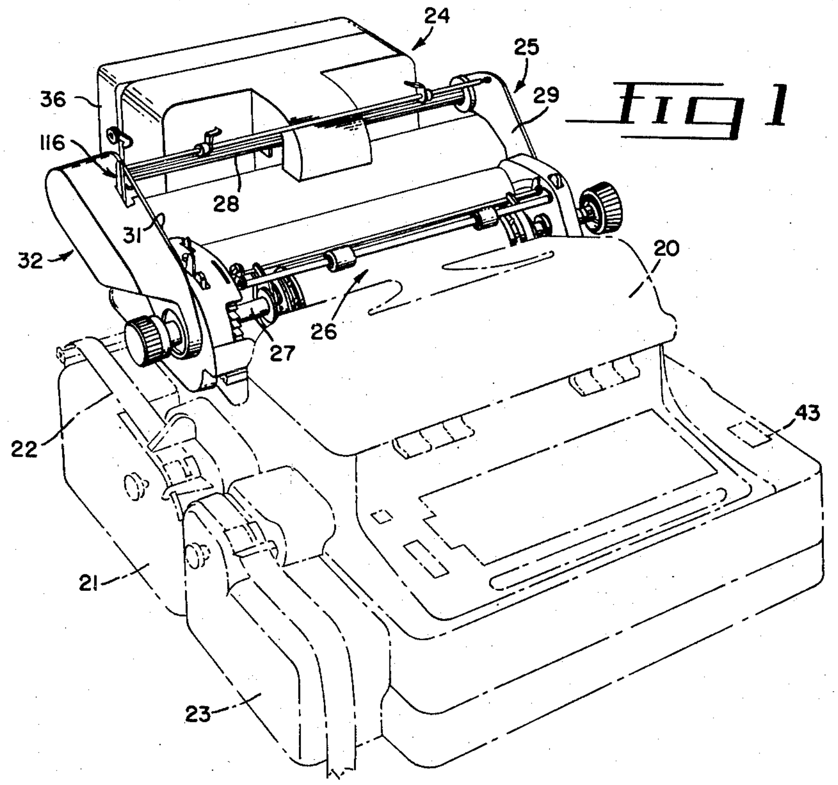

Referring to Figs. 1 to 11 of the drawings, the invention is disclosed as applied to an electrically powered typewriter 20. The typewriting machine is equipped with Flexowriter apparatus comprising a mechanism 21 punching a tape 22 by code in accordance with the material typed by the operator. The punched and coded tape 22 is run through a device 23 which interprets the code and automatically operates the typewriter therefrom. Thus, a form letter might be typed once by the operator to produce a tape 22, whereupon such tape could be run over and over again through the device 23, causing the typewriter repetitively to type the same letter on successive forms in a continuous record form strip passed over the platen.

To the rear of the typewriting machine is a strip feeding mechanism 24. The unit 24 is in relatively stationary relation to the typewriter carriage 25, which mounts a rotary platen 26 on a shaft 27. The feeding mechanism 24 is connected to the platen shaft 27 through a splined shaft 28, mounted in side frames 29 and 31 of the carriage 25, and a further motion transmitting unit 32 on the carriage frame 31.

Figure 3:
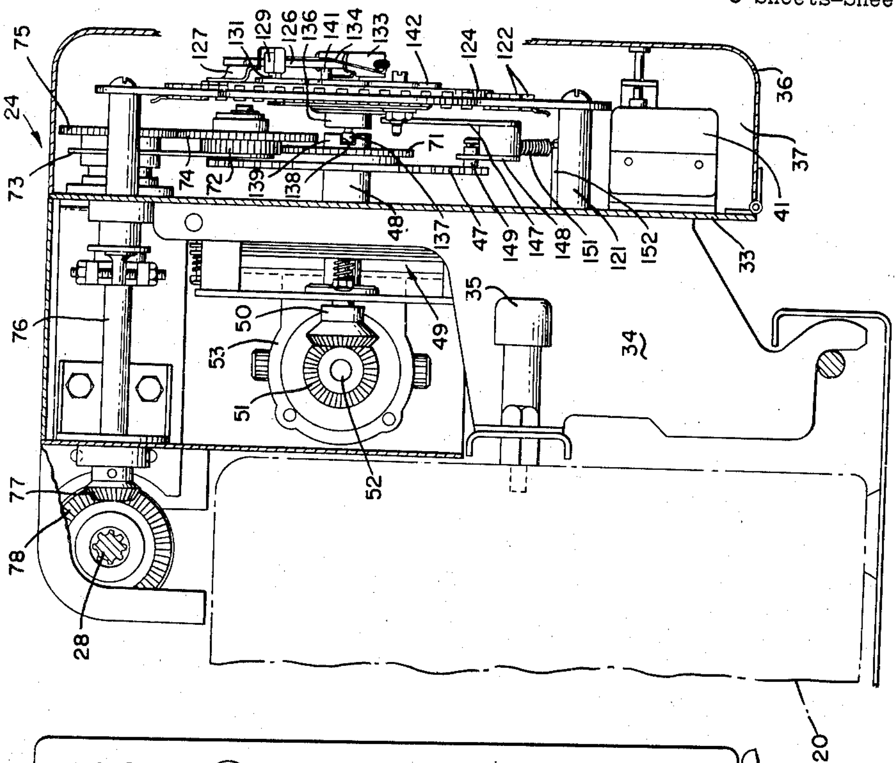
Fig. 3 is a view in cross section through the rear of the machine of Figs. 1 and 2, showing the strip feeding apparatus and associated parts in end elevation.
Figure 2:
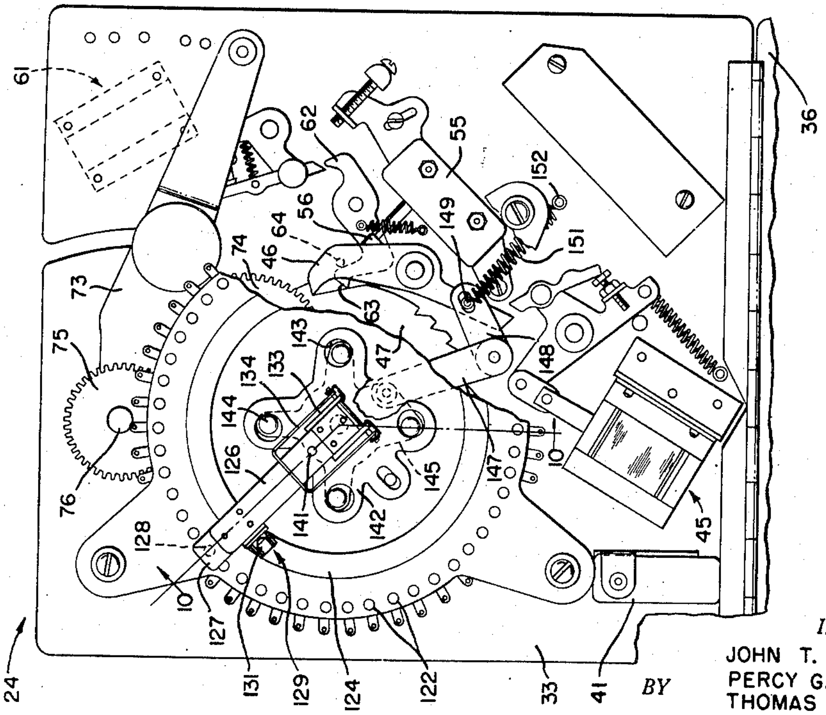
Fig. 2 is a detail view in side elevation of the line finder mechanism, showing the rotary stepping switch physically connected thereto.
Figures 4, 5, 6, 7:
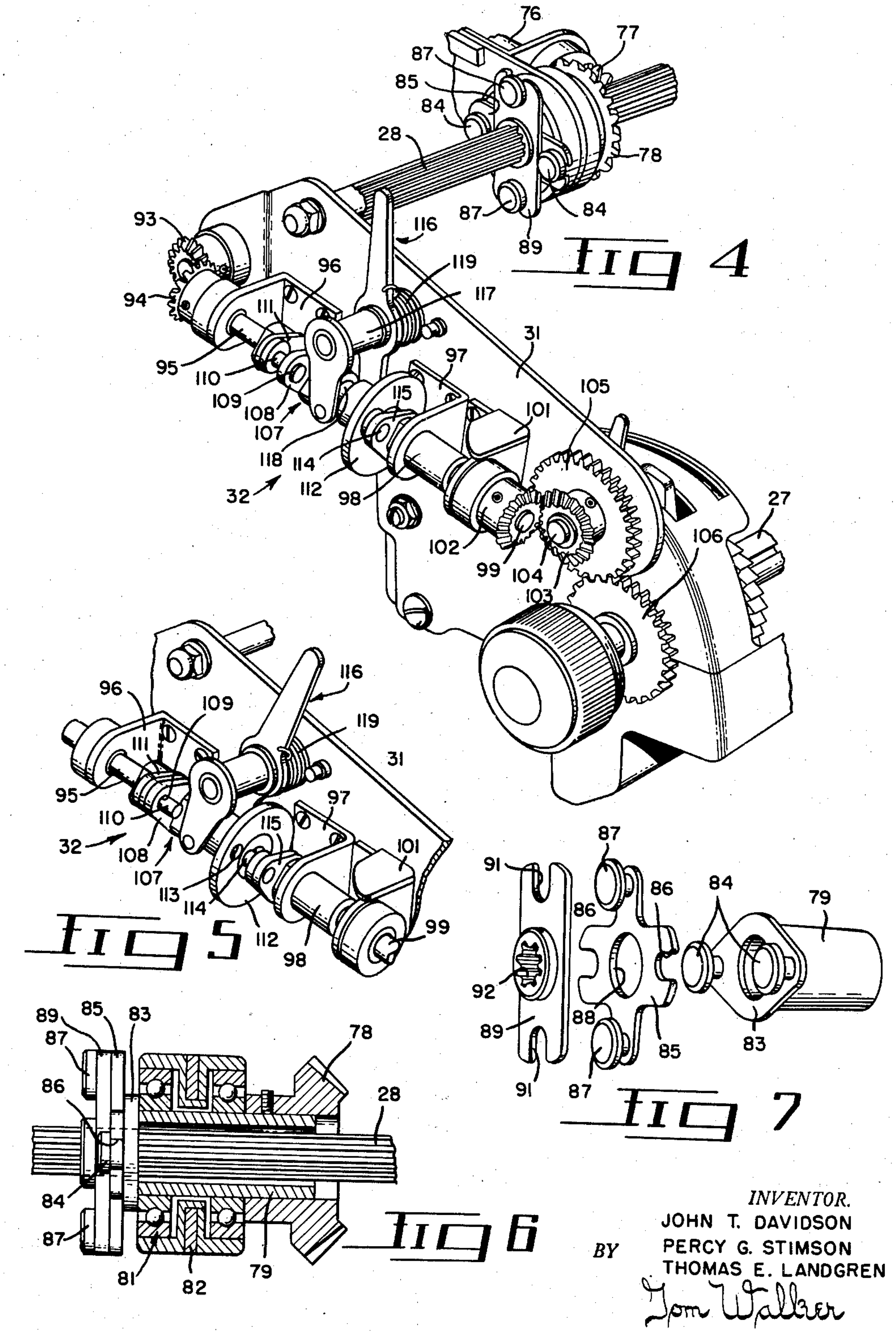
Fig. 4 is a detail view in perspective of the motion transmitting means between the power means and the rotary platen shaft.
Fig. 5 is a fragmentary view of the transmitting mechanism of Fig. 4, showing a coupling member comprised therein adjusted to a different control position.
Fig. 6 is a view in longitudinal section of a drive plate assembly comprised in the motion transmitting mechanism.
Fig. 7 is an exploded view, in perspective, of elements of the drive plate assembly shown in Fig. 6.
Figure 9:
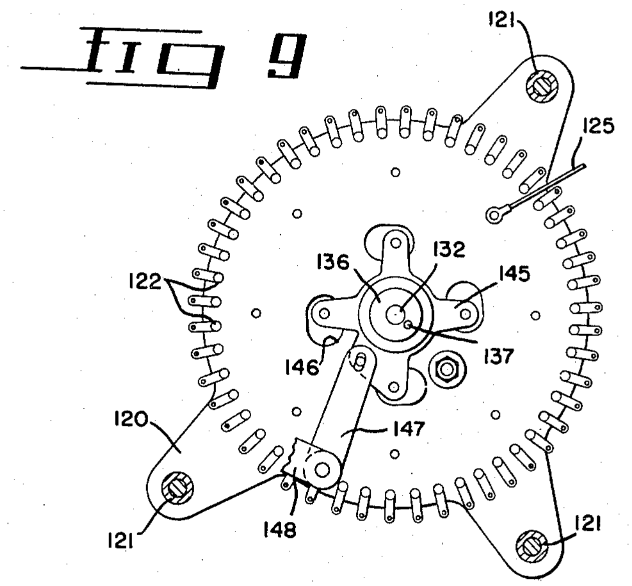
Fig. 9 is a detail view in front elevation of the rotary stepping switch of Fig. 2 and an operating control therefor.
Figure 10:
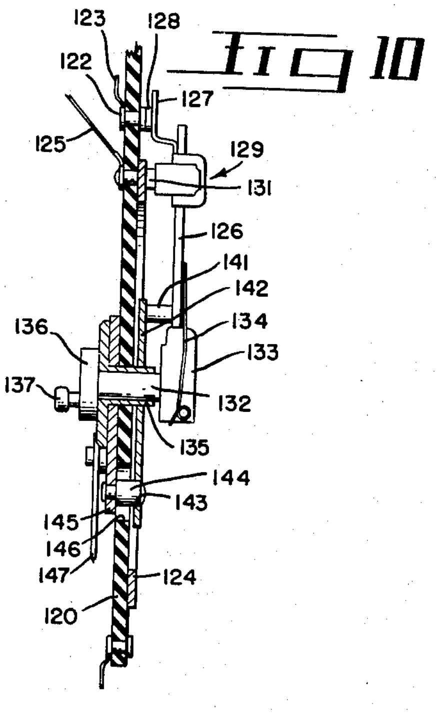
Fig. 10 is a view in cross section, taken substantially along the line 10—10 of Fig. 2, showing the stepping switch and operating control in one relative position of adjustment.
Figure 11:
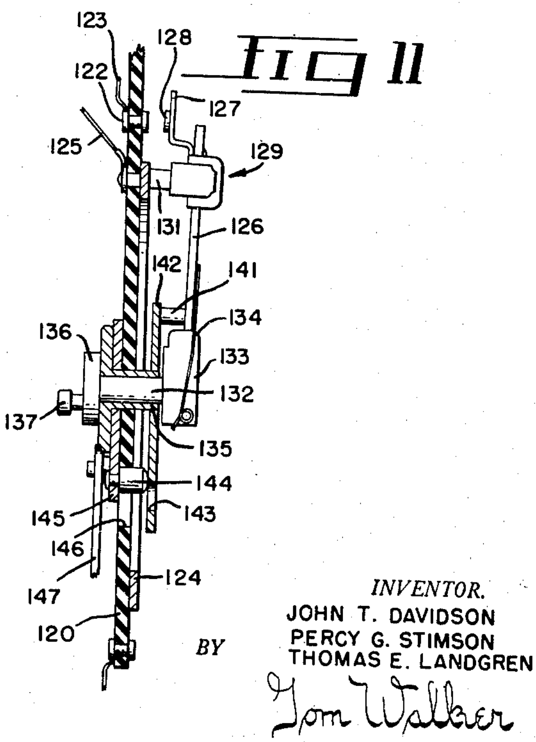
Fig. 11 is a view similar to Fig. 10, showing the stepping switch and operating control in another position of adjustment.

The unit 24 includes a relatively stationary wall 33, Fig. 3, forming a part of an auxiliary frame 34 attached to the main body of the typewriter 20 in a detachable manner, as by fastening means 35. A recessed cover 36 is hinged to the plate 33 and defines therewith a chamber 37 in which are the line finder and stepping switch controls of the illustrated embodiment of the invention.

Figure 8:
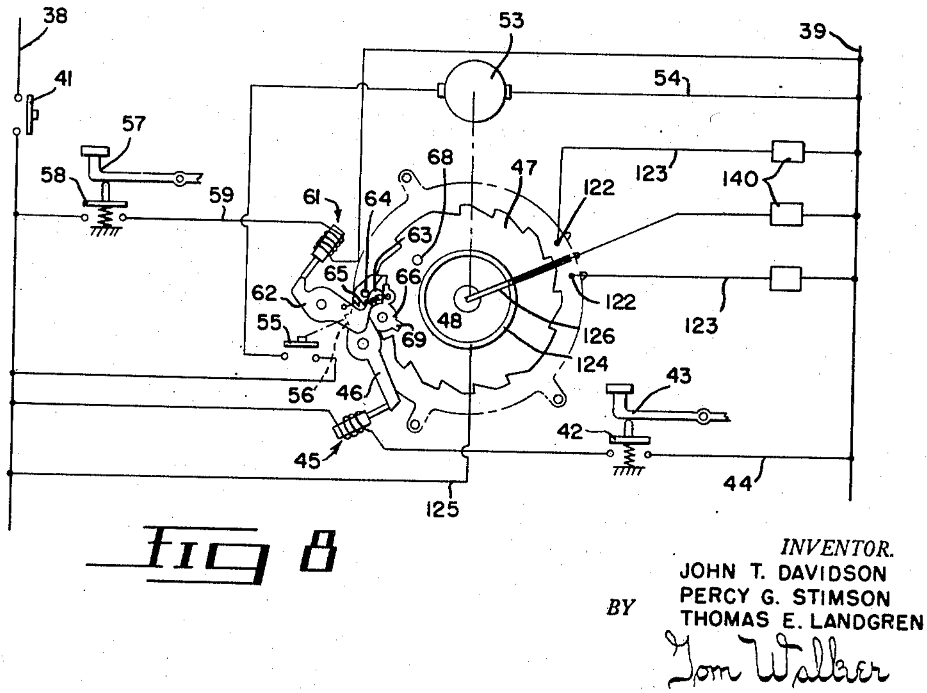
Fig. 8 is a diagrammatic view of the line finder mechanism and its relationship to the rotary stepping switch.

Thus, and referring also to Fig. 8, power lines 38 and 39 enter the chamber 37, the line 38 including a cover controlled safety switch 41. Another and normally open switch 42 is arranged to underlie the carriage return key 43 of the typewriter. Each time key 43 is depressed, therefore, to return the carriage at the end of a writing line, the switch 42 closes a circuit between the power lines 38 and 39 by way of a conductor 44. Within the conductor 44 is an electromagnetic device 45 operable upon the tail of a pawl 46, the nose of which engages the periphery of a notched program disc 47. The disc 47 is fast on a shaft 48 connected through a friction clutch 49 and bevel gears 50 and 51 to the output shaft 52 of an electric motor 53. The motor 53 is connected across the power lines 38 and 39 by a conductor 54 in which is a normally open switch 55 closed by a shoulder 56 on the pawl 46. The pawl 46 normally engages a tooth on the program disc 47. Energizing of the electromagnetic device 45 results in rocking of the pawl 46 in a counter-clockwise direction as seen in Fig. 8, as a result of which motion the nose of the pawl is disengaged from the disc 47 and the switch 55 is closed to cause a current to pass through the motor 53. Shaft 48 and program disc 47 accordingly are rotated. The mode of cooperation between the electromagnetic device 45 and the tail of pawl 46 is such, as may be seen in Fig. 2, as to cause the release of the pawl from the surface of the disc 47 to be a momentary operation, with the nose of the pawl immediately returning to the surface of the disc so as to engage the next succeeding notch therein. Upon each depression of the carriage return key 43, therefore, the program disc 47 is given one step in a rotary direction. The disc is connected, as will hereinafter be more clearly described, through the splined shaft 28 and transmission unit 32 to the platen shaft 27 so that a corresponding increment of rotary motion is imparted to the platen 26, advancing the record form thereon a distance of one line space.

In advancing the record strip from the last inscribed line of one form to the first writing line of the next succeeding form, a key 57 is depressed which may be one of the regular keys or a special key in the typewriter. A switch 58 is depressed thereby and a circuit closed between the power lines 38 and 39 by way of a conductor 59. Within the conductor 59 is an electromagnetic device 61 operating on a lever 62 which in turn has a finger 63 engageable with a stud 64 on the pawl 46 in a manner to withdraw the pawl from the periphery of the program disc 47. Motor 53 is at the same time energized, as has been seen, so that the disc 47 begins to turn. The described motion of the lever 62 tensions a spring 65 and causes a latch 66 to move to an engaged position relatively to the turned over end on finger 63, preventing return movement of the pawl 46 until the latch 66 is disabled by a stud 68 set in the side of the program disc 47 engaging a tail 69 on the latch 66. The location of the stud 68, it will be understood, is such as to correspond to or represent the first writing line of a record form. Thus, when the latch 66 is released thereby, allowing pawl 46 to reengage the disc 47, the disc is arrested in position bringing the first line of the next succeeding record form to the writing line on the platen.

Line finder mechanism generally as described above is disclosed and claimed in Stimson et al. application Serial No. 83,196, filed March 24, 1949, and in Davidson application Serial No. 426,458, filed April 29, 1954, for Strip Feeding Mechanism.

Transmitting the motion of the program disc 47 is a gear 71 fixed to the face thereof. The gear 71 meshes with an idler gear 72 supported by a relatively stationary frame element 73 and carrying a larger gear 74 meshing with still another gear 75. The gear 75 is on one end of a frame supported shaft 76, the other end of which carries a bevel gear 77 meshing with a larger bevel surface on a gear 78 in concentric surrounding relation to the aforementioned carriage mounted splined shaft 28. The gear 78 directly surrounds and is secured to one end of a sleeve 79 (see Fig. 6) rotatably mounted in a bearing assembly 81 supported on a stationary frame member 82. The sleeve 79 extends through and beyond the bearing assembly 81 and its oppositely projecting end is formed with a flange 83 on which are diametrically opposed studs 84. In adjacent parallel relation to the flange 83 is a plate 85 having in its periphery diametrically opposed slots 86 receiving the studs 84. In a plane at right angles to the plane of the slots 86 is another pair of diametrically opposed studs 87 on the plate 85 and there is also formed in the central part of the plate 85 an opening 88 allowing the shaft 28 to pass freely therethrough. In adjacent parallel relation to the plate 85 is a driving plate 89 having oppositely disposed peripheral slots 91 interengaged with the studs 87 and further having a central opening 92 splined to engage the shaft 28 for unison rotation therewith but permitting relative longitudinal motion of the shaft as it travels with the carriage. The arrangement of parts between the gear 78 and shaft 28, it will be understood, is such as to avoid binding as the carriage reciprocates relatively to the gear train extending from the program disc 47.

The splined shaft 28 is supported at its ends in the carriage frame elements 29 and 31. At the frame element 31, the shaft 28 projects through and beyond such element and has a bevel gear 93 mounted thereon meshing with another gear 94 on one end of a shaft 95. The latter shaft is rotatably carried by brackets 96 and 97 on the frame piece 31 and the opposite end of the shaft terminates in a sleeve 98 in spaced apart disconnected relation to another shaft 99. The sleeve 98 is rotatably mounted in the bracket 97 and the shaft 99 extends therefrom for support in another bracket 101 and carries on its projecting end a bevel gear 102 meshing with a like gear 103 on a stud 104 set in the frame piece 31. A gear 105 on the stud 104 meshes with a gear 106 on the platen shaft 27.

The transmission shafts 95 and 99 are selectively connected for unison rotary motion by a longitudinally adjustable sleeve member 107. At one end thereof, the member 107 has an arm 108 in which is an aperture 109 adapted to receive a pin 110 on an arm 111 fast on the shaft 95. At the other end of the sleeve member 107 is a disc 112 having an aperture 113 adapted to receive a pin 114 on an arm 115 fast on the sleeve 98, which latter element is connected as by pinning to the shaft 99. The pin 110 is relatively elongated and it will be understood that the sleeve member 107 is longitudinally adjustable in such manner as selectively to interengage the disc 112 with the pin 114. A forked lever 116 is rotatably mounted on a stud 117 on the frame member 31 and is interengaged with an annular recess 118 in the sleeve member 107. A portion of the lever 116 extends upward to be accessible to the hand of the operator and rocking of such lever results in disconnecting at will the platen shaft 27 from the power means in order that the platen may be adjusted by hand. A torsion spring 119 tends to hold the lever 116 in a position engaging disc 112 with the pin 114 and thereby completing the connection from the power source to the platen shaft. Adjustment of the lever 116 toward the front of the machine, or to the position shown in Fig. 5, disengages the disc 112 from the pin 114 and, while the parts are so held, the platen 27 may be rotated by hand.

Turning now to a consideration of the rotary stepping switch assembly, a plate 120 of insulating material is received in the chamber 37 and is mounted on the wall 33 in spaced apart parallel relation to the program disc 47 through spacer sleeves 121. Arranged in a rotary series on the plate 120 are electrical contacts 122 each connected by an individual lead 123 to the power line 39. Also on the plate 120 is an electrically conductive ring 124 connected by a lead 125 with the power line 38. A switch arm 126 carries at its outer end a finger 127 on which is a contact portion 128 adapted to be aligned with and to engage individual electrical contacts 122. The switch arm 126 also carries a brush assembly 129 including a brush member 131 urged resiliently outward into continuous contact with the ring 124.

The switch arm 126 is in the form of a flexible metallic blade and lies in parallel adjacent relation to the mounting plate 120 with the inner end of the arm, or that end opposite finger 127, lying in about the axis of the mounting plate 120. Such inner end of the arm 126 is anchored to one end of a stub shaft 132, there being also mounted on such shaft a bracket 133 providing a support for a U-shaped spring 134 urging the switch arm 126 in a direction to engage the contact portion 128 with one of the contacts 122. The stub shaft 132 is mounted in a bushing 135 in the plate 120 and on the opposite end thereof is a flange portion 136 mounting an eccentrically located stud 137. The stud 137 is received in a recess 138 in the hub 139 of the aforementioned gear 71 on the program disc 47. Rotation of the program disc accordingly results in a simultaneous and corresponding rotation of the switch arm 126.

From the described construction and arrangement of parts it will be understood that the switch arm 126 travels over the face of the mounting plate 120 in response to rotation of the program disc 47, with the finger portion 127 thereof engaging successive contacts 122 and with the brush assembly 129 continuously engaging the ring 124. As a result, a circuit across the power lines 38 and 39 is closed through individual and successive leads 123 in response to each step by step motion of the line finder mechanism. Interposed in each lead 123 is a device 140 energized by the closing of the circuit through its respective lead. The device 140 is representative of any unit which may be installed in the system for remote control by the line finder mechanism, it being understood that such devices may be made to correspond to certain positions on the program disc 47 and therefore to correspond to certain lines of the preprinted record forms in such wise that the operation desired upon energizing of the successive devices 140 will occur in a predetermined timed relation to advance of the record forms. In the illustrated embodiment of the invention an electrical lead 123 is contemplated from each contact 122 to the power line 39, and the several contacts 122 correspond to and represent writing lines on the record forms.

It may be desired, in moving from position to position of the stepping switch, and particularly during skip movement of the arm over groups of contacts, as during sweep feed from the last inscribed line of one record form to the first writing line of the next succeeding form, to hold the switch arm out of engagement with the contacts 122 during motion of the arm. Mechanism provided for this purpose includes a stud 141 on the arm 126 contacting a plate 142 slidably mounted on the bushing 135. The plate 142 has a circular series of openings 143 adapted respectively to receive studs 144 mounted on a plate 145 on the opposite side of the mounting member 120 and reaching cooperative engagement with the plate 142 through elongated slots 146 in the member 120. The plate 145 is rotatably mounted on the bushing 135, and it will be apparent that rotary motion of the plate 145 will produce an axial shifting motion of the plate 142 as the studs 144 ride into and out of the openings 143. Thus, in moving from the position in Fig. 10 to the position shown in Fig. 11, the plate 145 moves the studs 144 out of the openings 143 with the result that the plate 142 is shifted axially outward. Through the stud 141, such motion is transformed into an outward flexing of the switch arm 126 in a manner to disengage the contact member 128 thereon from a position of cooperative relationship with the circular series of contacts 122. During rotary travel of the arm 126, in this position of the parts, there is accordingly no electrical circuit made through the stepping switch assembly.

Rotation of the plate 145 is accomplished through a link 147 pivotally connected at its one end to such plate and at its other end to one end of an arm 148, the opposite end of the latter arm being pivotally connected to a stud 149 on the program disc arresting pawl 46. A spring 151 is connected to the pawl 149 and anchored to a stud 152 set in the frame wall 33. The spring 151 resiliently holds the pawl 46 in engagement with the periphery of the program disc 47, and through the linkage 147—148 tends also to hold the plate 145 in the position shown in Fig. 10 with the studs 144 aligned with and received in the openings 143 in the plate 142. Rocking of the pawl 46 (in a clockwise direction as viewed in Fig. 2) serves to release the program disc 47 for rotation, serves also to start the motor 53, and now as may be seen serves still further to rock the plate 145 rotatably to displace the studs 144 from the openings 143 and so shift the plate 142 axially with a consequent disengagement of the switch arm 126 from the series of contacts 122, the parts continuing to be so held until the pawl 46 returns to engagement with the program disc, marking the end of a strip feeding operation. As a part of such return motion, the plate 145 is rocked back to the position of Fig. 10, allowing the plate 142 to return axially toward the mounting member 120 and thereby permitting the switch arm 126 to resume a position of contacting relationship relatively to the contacts 122.

Figure 12:
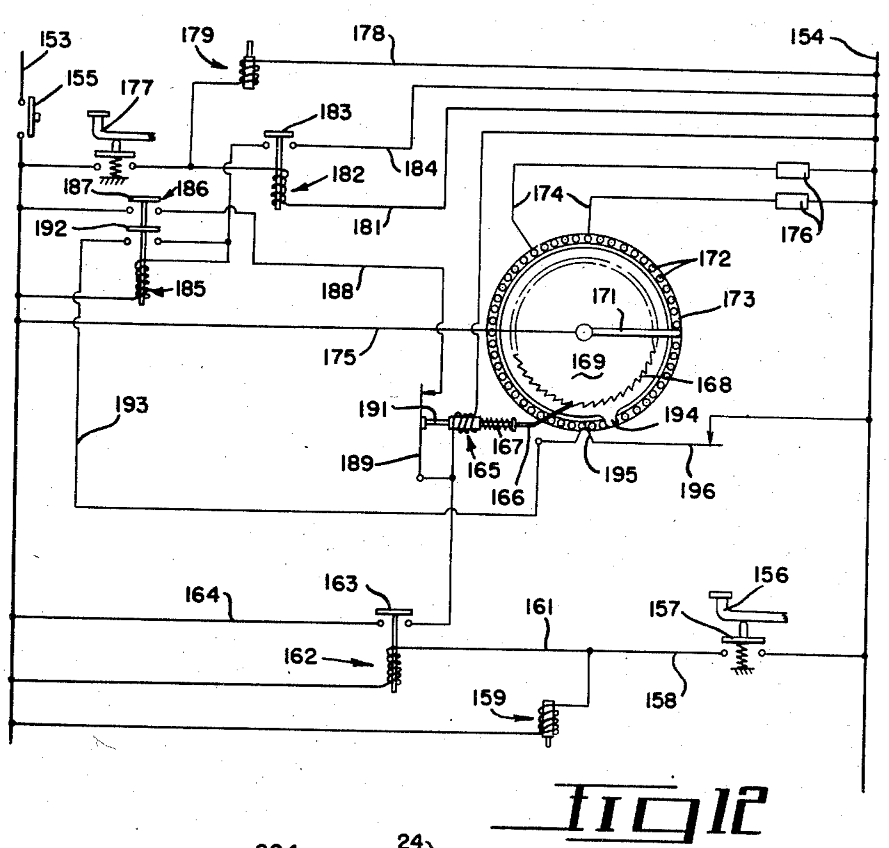
Fig. 12 is a view similar to Fig. 8 showing the rotary stepping switch physically disassociated from the line finder mechanism but electrically operated therewith.

Referring to the modified form of invention shown in Fig. 12, the rotary stepping switch assembly is in this instance electrically connected for operation in synchronism with the program disc but is physically disassociated therefrom and may in fact be comprised in a unit separated from the writing machine proper.

Power lines leading to the unit are indicated at 153 and 154, the former including a cover closed safety switch 155. A key 156 represents the carriage return key of the typewriter and is arranged to depress a switch 157 to close a circuit between the power lines 153 and 154 by way of a conductor 158. Within the conductor 158 is an electromagnetic device 159 corresponding to the device 45 of the mechanism of Fig. 8. Depression of the key 156, therefore, is effective through the electromagnetic device 159 to achieve one increment of movement of the program disc and thereby one line spacing operation of the typewriter platen.

A branch 161 of the conductor 158 incorporates an electromagnetic device 162 acting when energized to pull down a switch 163 to close a circuit across the power lines 153 and 154 by way of a conductor 164. In the conductor 164 is electromagnetic means 165 operable when energized to retract a stepping pawl 166 against the urging of a spring 167. The pawl 166 is arranged to engage ratchet teeth 168 on a rotary switch means 169 which includes a rotatable switch arm 171. The outer end of the arm 171 is arranged to engage successive electrical contacts 172 on a relatively stationary plate 173, which contacts are connected by individual respective leads 174 to the power line 154. The switch arm 171 is connected through a lead 175 at the base thereof to the other power line 153. The individual leads 174 have interposed therein devices 176 corresponding to the operating components 140 of the Fig. 8 embodiment. In the diagrammatic illustration hereof electrical leads 174 are connected only to selected contacts 172. It will be understood that all, or any predetermined arrangement of contacts less than the total number, may be electrically connected in the system in accordance with the work to be done.

Depression of the key 156, therefore, not only energizes the device 159 for a line spacing operation of the platen but also energizes the device 162 to close a circuit through the electromagnet 165. When this occurs, the pawl 166 is retracted against the urging of spring 167. Release of the key 156 deenergizes the device 162, opening switch 163 and deenergizing the electromagnetic means 165. The pawl 166 returns outward by the spring 167 and in the course of such movement engages a notch 168 on the switch means 169 turning such means one step in a counter-clockwise direction, advancing the switch arm 171 out of engagement with one contact 172 and into engagement with the next adjacent one of said contacts. The pawl 166, it will be understood, is spring biased toward the series of ratchet teeth 168 so that as it is withdrawn from engagement with one tooth it will move inward for contact with the next following tooth as it is again advanced from retracted position.

A key 177 in the diagram of Fig. 12 corresponds to the key 57 in the diagram of Fig. 8. Thus, it is depressed to initiate a skip feeding operation, that is, one in which the record strip material is advanced from the last inscribed line of one record form to the first writing line of the next succeeding form. Depression of the key 177 closes a circuit between the power lines 153 and 154 by way of a conductor 178 in which is an electromagnetic device 179 corresponding to the device 61 of Fig. 8. Thus, upon energizing of the device 179 the pawl holding the program disc from rotation is released and is held in non-engaging position until the program disc has completed a degree of rotary motion necessary to position the first writing line of the next following record form at the writing line of the platen. A branch 181 of the conductor 178 includes an electromagnetic device 182 which is also energized by depression of the key 177. The device 182 is adapted to pull down a switch 183 to close a circuit across the power lines 153 and 154 by way of a conductor 184. This latter conductor includes an electromagnetic device 185 effective to pull down a double switch 186. A part 187 of the switch 186 is adapted to close a circuit across the power lines 154 and 153 by way of a conductor 188 and a part of conductor 164, the conductor 188 being connected to or tied into the conductor 164 at a point between the switch 163 and the electromagnetic means 165. The closing of switch 187 thus is effective to energize the electromagnet 165 to bring about an actuation of the pawl 166 and an advance of the switch arm 171 one increment of movement. The conductor 188 includes a spring contact portion 189 engaged by a rearwardly extending part 191 of the reciprocating pawl 166. Retraction of the pawl 166, in response to energizing of the means 165, rocks the spring contact 189 in a direction to open the circuit through conductor 188. The electromagnetic means 165 accordingly is immediately deenergized, permitting a return motion of the pawl 166 and thereby an advance of the switch arm 171. Such return motion of the pawl 166, however, restores the spring contact 189 to a position reclosing the circuit through conductor 188 and so reenergizing the electromagnetic means 165. A continuous series of reciprocating motions of the pawl 166, with consequent stepping movements of the switch arm 171, will take place as long as the switch part 187 remains in a position closing the circuit through conductor 188.

The other part 192 of the double switch 186 is arranged to close a circuit through a conductor 193 which at its one end is connected to the power line 154 and at its other end is connected to or tied into the conductor 184 at a point between the switch 183 and electromagnetic device 185. The arrangement of parts, it will be recognized, is such that conductor 193 and switch 192 operate as a holding circuit to maintain the device 185 energized and the switch 187 closed irrespective of release of the key 177 and consequent opening of switch 183. When the switch 183 is closed, therefore, and electromagnetic device 185 energized to pull down the double switch 186 the parts will remain so positioned even though the switch 183 is immediately permitted to open. As long as the holding circuit conductor 193 remains closed the electromagnetic means 165 and 166 will carry out a continuous series of self-interrupted actuations of the switch arm 171, moving it over the bank of contacts 172.

The circuit through conductor 193 is opened through cooperation of a projecting cam portion 194 on the rotary switch means 169 engageable with a similarly shaped portion 195 on a spring contact portion 196 interposed in the conductor 193. The number of stepping movements of the switch means 169, in response to depression of the key 177, thus will be determined by the position of cam portion 194 relatively to cooperating portion 195 at the time the key 177 is depressed. When such parts reach cooperative relation, the portion 194 is effective to rock the spring contact portion 196 to a position opening the circuit through conductor 193. In response thereto the electromagnetic device 185 is deenergized, the switch part 187 is opened and the intermittent actuation of electromagnetic device 165 accordingly is discontinued. At the end of such a series of operations the switch arm 171 always will occupy the same position on the bank of contacts 172 and this position will be termed the starting or home position of such arm and will correspond to the first writing line of the preprinted record forms.

Figure 13:
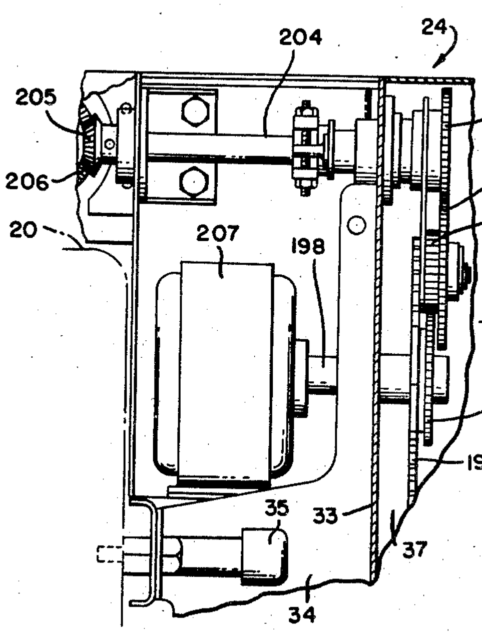
Fig. 13 is a view similar to Fig. 3 showing the strip feeding apparatus actuated by a stall type motor.

In Fig. 13 a strip feeding apparatus is illustrated of a kind useful in connection with either the embodiment of Figs. 1 through 11 or the embodiment of Fig. 12. The apparatus of Fig. 13 is substantially the same in the transmission of motive power as the previously disclosed construction. Thus, a program disc 197 is on a shaft 198 and drives a gear train comprising gears 199, 201 and 202 and terminating in a gear 203 on a shaft 204. The latter through a bevel gear 205 drives a gear 206 corresponding to the gear 78 of Fig. 6 and through such gear turns the platen in the same manner and by like means as in the previously considered embodiment. In the present instance, however, in place of the motor 53 there is here provided a stall type motor 207. In the use of this type motor a friction clutch mechanism, like that indicated at 49 in Fig. 3 between the motor and the program disc, may be eliminated and the motor operating electrical controls operating upon closure of switch 55 (in Fig. 8) may also be omitted. While the program disc is being held by its pawl the motor stalls. If either the carriage return key or the special key provided for skip feeding are depressed whereby to disengage the pawl from the program disc, the motor is released and starts to turn the program disc, the extent of such motion being determined by control of the pawl in the manner before disclosed.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described our invention, we claim:

1. In a typewriting or like machine operable on preprinted record forms, a rotary platen, power means for rotating said platen, line finder means controlling the rotary movements of said platen, including a rotary program disc turned by said power means, a relatively stationary switch plate, a circular series of separated electrical contacts on said plate, one for each line of said forms, an electrically conductive ring on said plate, an external electrical circuit having individual parallel connections to said contacts and a common connection to said ring, and a switch arm rotated by said program disc into successively aligned relation with said electrical contacts and continuously contacting said ring.

2. A typewriting or like machine according to claim 1, characterized by means for disengaging said switch arm from said contacts during rotary motion of said arm.

3. A typewriting or like machine according to claim 1, wherein said switch arm is biased to engage a contact when aligned therewith, characterized by means for disengaging said switch arm therefrom preparatory to rotary movement of said arm.

4. In a typewriting or like machine operable on preprinted record forms, a rotary platen, a stepping switch assembly including a circular series of separated electrical contacts, one for each line of said form, said assembly further including a rotary switch arm movable over said series of contacts, an external electrical circuit having individual parallel connection to contacts of said series and having common contact with said switch arm, means for rotating said platen, said means including a depressible key in said machine and an electrical circuit closed by depression of said key, and motor means for stepping said switch arm over said contacts responsive to closing of said last named circuit.

5. A typewriting or like machine, according to claim 4, characterized in that said means for rotating said platen further includes a program disc rotated by said motor means and connected to said switch arm for corresponding and simultaneous rotation thereof.

6. A typewriting or like machine according to claim 4, characterized in that said motor means comprises a reciprocable pawl for moving said switch arm and a relay in said electrical circuit energized by closing of said circuit.

7. In a typewriting or like machine operable on preprinted record forms, a rotary platen, a stepping switch assembly including a circular series of separated electrical contacts, one for each line of said forms, said assembly further including a rotary switch arm movable over said series of contacts, an external electrical circuit having individual parallel connection to contacts of said series and having common contact with said switch arm, means for rotating said platen and said switch concomitantly and in corresponding extents, said means including a depressible key in said typewriter, and motor means energized in response to depression of said key.

8. A typewriting or like machine according to claim 7, characterized in that said motor means comprises a single motor and connections therefrom to said platen and to said switch arm for simultaneous operation thereof.

9. A typewriting or like machine according to claim 7, characterized in that said motor means comprises separate motors and individual connections therefrom respectively to said platen and said switch arm.

10. In a typewriting or like machine, a relatively stationary frame, a carriage reciprocably mounted on said frame, a rotatable platen carried by said carriage, a rotatable splined shaft carried by said carriage, motion transmitting means on said carriage including a part adjustable to place said platen alternatively under hand control and under operating control by said shaft, a gear supported by said frame in surrounding relatively rotating relation to said shaft, a connection between said gear and said shaft providing for relative axial motion therebetween and unison rotary motion with some freedom of relative bodily shifting motion in a lateral sense, key actuated means, a stepping switch assembly including a rotary switch arm, and motor means energized by said key actuated means for turning said gear and for concomitantly rotating said switch arm.

11. A typewriting or like machine according to claim 10, characterized in that said motor means comprises a stall type rotary motor, a program ratchet driven thereby and operatively connected to said gear and a pawl released by said key actuated means normally holding said program ratchet against rotation by said motor.

12. A typewriting or like machine according to claim 10, characterized by means including a program disc interconnecting said motor means and said gear, said program disc being connected to said switch arm for simultaneous and corresponding motions of said switch arm and said disc.

13. A typewriting or like machine according to claim 10, characterized in that said motor means comprises separate motors for said gear and said switch arm, the motor for said switch arm being an electromagnet in an electric circuit closed by said key actuated means.

14. A typewriting or like machine according to claim 10, characterized by a lever carried by said carriage for convenient hand manipulation for adjusting said part in said motion transmitting means.

15. A typewriting or like machine according to claim 10, characterized in that the connection between said gear and said shaft comprises a sleeve to which said gear is made fast, a bearing for said sleeve in said frame, and means mounted on said sleeve for limited relative bodily shifting motion having a splined connection with said shaft.

16. In a typewriting or like machine, motor means, line spacing mechanism operated by said motor means including a rotary program disc, a releasable pawl arresting said disc, means for releasing said pawl; a stepping switch assembly for controlling an external circuit in synchronism with said line spacing mechanism, said assembly including a rotary switch arm movable with said program disc and further including individual contacts successively engageable by said arm, and means operable in conjunction with said releasable pawl for lifting said switch arm out of engageable relation to said contacts.

17. In a typewriting or like machine operable on preprinted record forms, a line spacing mechanism, a stepping switch assembly for controlling an external circuit in synchronism with said line space mechanism, including a circular series of electrical contacts and a rotary switch arm, an electromagnet including reciprocable plunger means for advancing said switch arm seriatim over said contacts, a switch for closing a circuit through said electromagnet, another switch alternately opening and closing a circuit through said electromagnet in response to reciprocation of said plunger means, and still another switch opening a circuit through said electromagnet in response to arrival of said switch arm in a rotary position corresponding to the first writing line of a record form.

18. In a typewriting or like machine operable on preprinted record forms, a line spacing mechanism including power means, means for setting said power means in operation including a normally open electrical circuit, a key operated switch for closing said circuit; a stepping switch assembly for controlling an external electrical circuit in accordance with the movements of said line spacing mechanism, including a rotary switch arm, electromagnetic means for rotating said switch arm in step by step fashion, a supplemental circuit normally open and including said electromagnetic means, relay means for closing said supplemental circuit, other relay means responsive to closing of the first said circuit for energizing the first said relay means, a holding circuit closed by energizing of the first said relay means for keeping said first relay means energized, interrupter means operated by said electromagnetic means for alternately opening and closing said supplemental circuit, and means operating in a predetermined rotary position of said switch arm to open said holding circuit.

19. In a typewriting or like machine, a reciprocable carriage, a rotatable platen carried thereby, power means for rotating said platen, motion transmission means including a pair of disconnected shafts on said carriage, substantially opposed actuating arms on said shafts, a coupling member extending between and interconnecting said arms for unison rotation of said shafts, said member being shiftable for disconnection from one of said arms, and manipulative means on said carriage for shifting said member.

20. In a typewriting or like machine, a reciprocable carriage, a rotatable platen carried thereby, a relatively stationary frame in supporting relation to said carriage, power means on said frame, motion transmission means from said power means to said platen including a splined shaft mounted in said carriage; a frame mounted rotary bearing through which said splined shaft extends, a sleeve rotatable in said bearing and in surrounding spaced apart relation to said shaft, the opposite ends of said sleeve projecting from opposite ends of said bearing, a gear secured to one end of said sleeve rotatively driven by said power means, spaced apart studs on the opposite end of said sleeve, a plate having a central opening through which said shaft is passed and formed with diametrically opposed slots receiving said studs, other spaced apart studs on said plate in a plane at right angles to the plane of said slots, and another plate in adjacent parallel relation to the first said plate having a central opening in splined engagement with said shaft and formed with diametrically opposed slots receiving said studs on the first said plate.

References Cited in the file of this patent

UNITED STATES PATENTS

| | | |
|---|---|---|
| 2,138,646 | Scharr | Nov. 29, 1938 |
| 2,213,552 | Scharr | Sept. 3, 1940 |
| 2,255,011 | Lake et al. | Sept. 2, 1941 |
| 2,285,258 | Doty | June 2, 1942 |